United States Patent
Inda et al.

(10) Patent No.: US 6,475,677 B1
(45) Date of Patent: Nov. 5, 2002

(54) GLASS-CERAMIC COMPOSITE ELECTROLYTE AND LITHIUM SECONDARY CELL

(75) Inventors: Yasushi Inda, Sagamihara (JP); Kazuo Ohara, Yokohama (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

(21) Appl. No.: 09/557,670

(22) Filed: Apr. 25, 2000

(30) Foreign Application Priority Data

Apr. 30, 1999 (JP) .......................... 11-125006
Apr. 20, 2000 (JP) ...................... 2000-119058

(51) Int. Cl.⁷ .................. H01M 06/18; H01L 29/12
(52) U.S. Cl. ................. 429/304; 429/322; 252/62.2
(58) Field of Search ................. 429/304, 313, 429/306, 302, 303, 188, 252, 251, 247, 248, 321, 322; 252/62.2

(56) References Cited

U.S. PATENT DOCUMENTS 5,449,576 A    9/1995  Anami
6,159,638 A  * 12/2000  Takatera et al. ............ 429/309

FOREIGN PATENT DOCUMENTS

| EP | 0857699 | 8/1998 |
| EP | 0981176 | 2/2000 |
| JP | 02302307 | 12/1990 |
| JP | 05139781 | 6/1993 |
| JP | 09142874 | 8/1998 |

OTHER PUBLICATIONS

European Search Report, Munich, Aug. 11, 2000, Examiner Engl, H.

* cited by examiner

Primary Examiner—Stephen Kalafut
Assistant Examiner—R Alejandro
(74) Attorney, Agent, or Firm—Hedman & Costigan, P.C.

(57) ABSTRACT

There is provided a glass-ceramic composite electrolyte including a medium containing glass-ceramic powder impregnated with a non-aqueous electrolytic solution. There is also provided a lithium secondary cell having a positive electrode, a negative electrode and a separator in which the separator includes the above described composite electrolyte. The glass-ceramic powder consists of grains having an average grain diameter of 20 $\mu$m or below (calculated on the basis of volume), a maximum grain diameter of 44 $\mu$m or below and lithium ion conductivity of $1 \times 10^{-4} \text{S} \cdot \text{cm}^{-1}$ or over. The glass-ceramic composite electrolyte has thickness of 100 $\mu$m or below and lithium ion conductivity of $1 \times 10^{-5} \text{S} \cdot \text{cm}^{-1}$ or over.

5 Claims, 3 Drawing Sheets

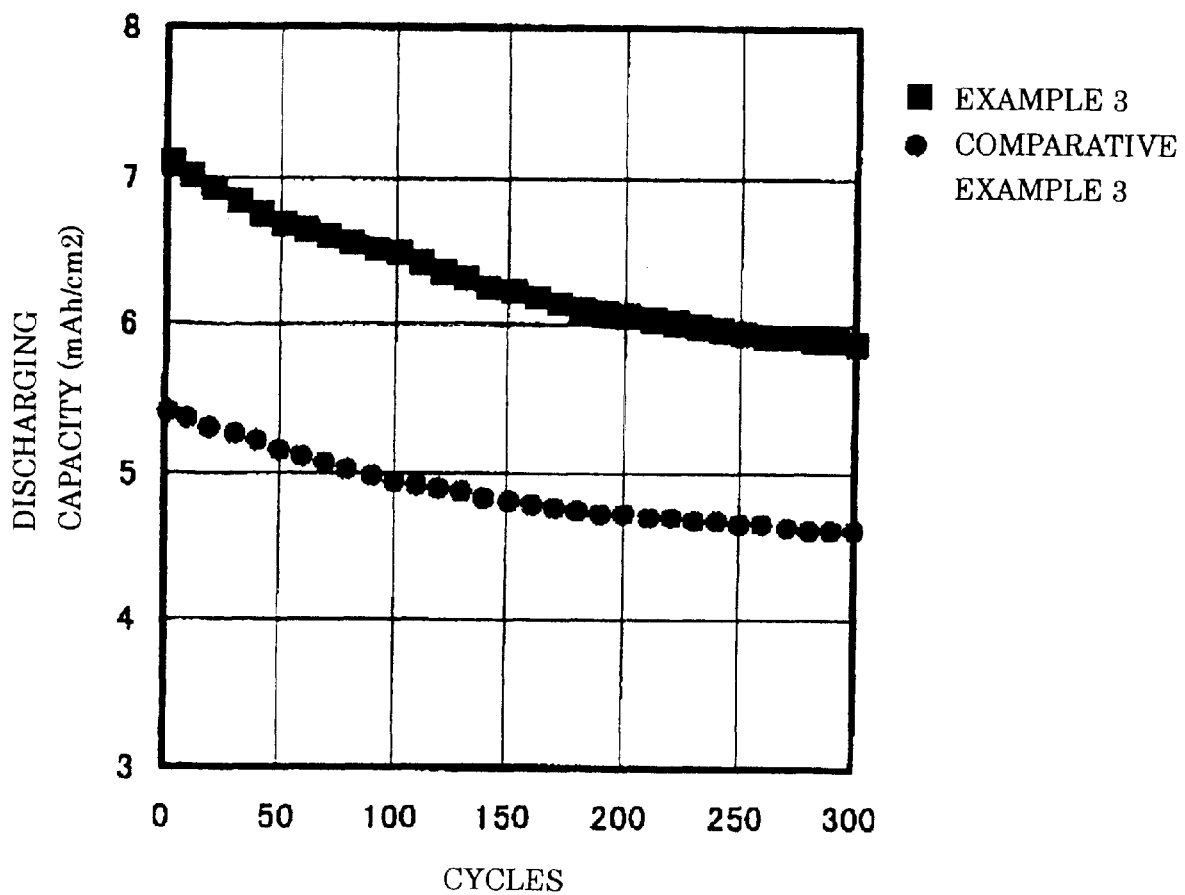
F I G. 3

US 6,475,677 B1

GLASS-CERAMIC COMPOSITE ELECTROLYTE AND LITHIUM SECONDARY CELL

BACKGROUND OF THE INVENTION

This invention relates to a composite electrolyte comprising lithium ion conductive glass-ceramic powder. This invention relates also to a lithium secondary cell comprising this composite electrolyte.

An aqueous or non-aqueous electrolytic solution has generally been employed as an electrolyte for an electric cell. A lithium secondary cell employing a polymer electrolyte made of a polymer material instead of the conventional electrolytic solution has recently drawn attention of the industry. In this type of lithium secondary cell using the polymer electrolyte, electrolytic solution is held in a polymer electrolyte and, therefore, this type of lithium secondary cell is advantageous in that leakage of electrolytic solution as well as corrosion are prevented and, moreover, the structure of the cell is simple and assembling of the cell is easy.

Since lithium ion conductivity of the polymer electrolyte is lower than the electrolytic solution, efforts have been made to reduce thickness of the polymer electrolyte. Reduction in thickness of the polymer electrolyte, however, causes reduction in mechanical strength of the polymer electrolyte with the result that the polymer electrolyte tends to be damaged in the process of production thereby causing short-circuiting of a positive electrode with a negative electrode.

It has, therefore, been proposed, as in Japanese Patent Application Laid-open Publication No. Hei 6-140052 for example, to provide a composite electrolyte by adding an inorganic oxide such as alumina in an electrolyte and thereby increase the mechanical strength. Besides alumina, inorganic oxides such as silica and lithium aluminate are also proposed for addition.

The addition of an inorganic oxide such as alumina to the electrolyte, however, has the disadvantage that lithium ion conductivity in the composite electrolyte is significantly reduced. Besides, when charging and discharging are repeated in a lithium secondary cell comprising this composite electrolyte, reaction between the electrolyte and the inorganic oxide takes place with the result that charging-discharging cycle characteristics in the lithium secondary cell are significantly deteriorated.

It is, therefore, an object of the invention to provide an electrolyte having a medium impregnated with a non-aqueous electrolytic solution which has a high ion conductivity and has sufficient mechanical strength even if thickness of the electrolyte is reduced.

It is another object of the invention to provide a lithium secondary cell comprising a separator made of an electrolyte impregnated with a non-aqueous electrolytic solution which has a high cell capacity, improved charging-discharging characteristics and a long, stable cell life.

SUMMARY OF THE INVENTION

Numerous experiments made by the inventors of the present invention have resulted in the finding, which has led to the present invention, that a glass-ceramic composite electrolyte comprising a polymer medium in which glass-ceramic powder of a specific composition and a non-aqueous electrolytic solution are dispersed has a remarkably higher lithium ion conductivity than the prior art composite electrolyte containing an inorganic oxide which does not exhibit lithium ion conductivity. It has also been found that, by applying the composite electrolyte thus obtained to a lithium secondary cell, the cell capacity can be increased and the charging-discharging characteristics can be remarkably improved as compared to a case where the prior art composite electrolyte containing an inorganic oxide which does not exhibit lithium ion conductivity is applied to the lithium secondary cell.

For achieving the object of the invention, there is provided a glass-ceramic composite electrolyte comprising a medium containing glass-ceramic powder impregnated with a non-aqueous electrolytic solution.

According to the invention, the composite electrolyte contains the lithium ion conductive glass-ceramic powder in the lithium ion conductive electrolyte and, therefore, lithium ion conductivity in the electrolyte is not substantially reduced while the mechanical strength of the electrolyte is improved and the cell capacity, particularly charging characteristic, of a lithium secondary cell using this composite electrolyte is increased.

Further, since reactivity of the glass-ceramic powder is very low, reaction between the glass-ceramic powder and the electrolytic solution during charging and discharging hardly takes place and, therefore, reduction in the charging-discharging characteristics of a lithium secondary cell due to reaction between an inorganic oxide such as alumina and an electrolyte as in the prior art composite electrolyte can be prevented.

In one aspect of the invention, the glass-ceramic powder consists of grains having an average grain diameter of 20 $\mu$m or below (calculated on the basis of volume), a maximum grain diameter of 44 $\mu$m or below and lithium ion conductivity of $1 \times 10^{-4} S \cdot cm^{-1}$ or over.

In another aspect of the invention, the medium comprises a sheet-like polymer material containing glass-ceramic powder.

In another aspect of the invention, the composite electrolyte has a thickness of 100 $\mu$m or below and lithium ion conductivity of $1 \times 10^{-5} S \cdot cm^{-1}$ or over.

In another aspect of the invention, the medium contains 10% to 90% in weight percent of the glass-ceramic powder.

In another aspect of the invention, there is provided a lithium secondary cell having a positive electrode, a negative electrode and a separator wherein said separator comprises the above described composite electrolyte of the invention.

The invention will be described more in detail with reference to the accompanying drawings.

BRIEF DESCRIPTION OF THE DRAWINGS

In the accompanying drawings,

FIG. 3 is a graph showing change in discharging capacity in charging and discharging cycles of lithium secondary cells including composite electrolytes of Example 3 and Comparative Example 3;

DETAILED DESCRIPTION OF THE INVENTION

Figure 1:
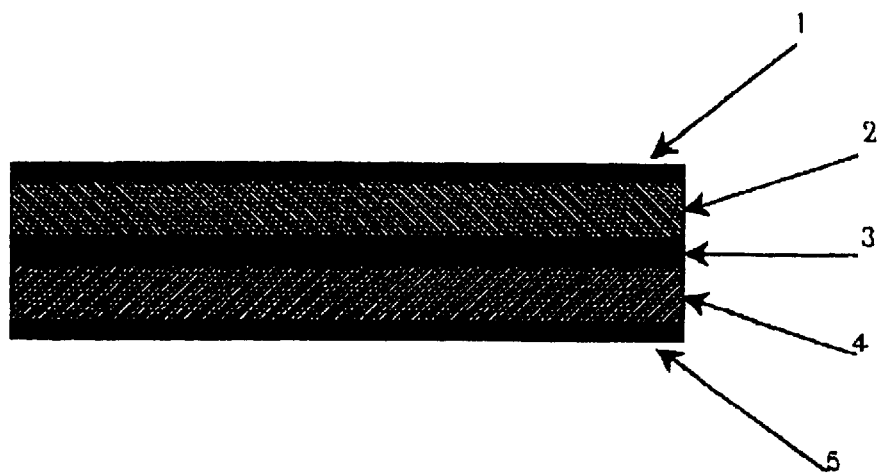
FIG. 1 is a sectional view showing a lithium secondary cell including a glass-ceramic composite electrolyte of Example 2 of the invention.

In a case where the composite electrolyte of the invention is used for a cell, the thinner is the composite electrolyte, the broader area of electrodes per unit volume the cell can secure with resulting higher capacity of the cell. For this reason, it is preferable for the composite electrolyte of the invention to have a sheet-like configuration having a thickness of 100 $\mu$m or below. It is also preferable for lithium ion conductivity and mechanical strength of the composite electrolyte of the invention that the glass-ceramic powder is dispersed uniformly in the medium. For obtaining excellent dispersion of the glass-ceramic powder, it has been found that the glass-ceramic powder should preferably have an average grain diameter of 20 $\mu$m or below and, more preferably, 10 $\mu$m or below. It has also been found that maximum grain diameter should preferably be 44 $\mu$m or below.

Movability of lithium ion during charging and discharging in a lithium secondary cell depends upon lithium ion conductivity of the electrolyte used in the cell. A high lithium ion conductivity of the composite electrolyte of the invention therefore is preferable. More specifically, it has been found that lithium ion conductivity should preferably be $1 \times 10^{-5}$ S·cm$^{-1}$ or over and, more preferably, $1 \times 10^{-4}$ S·cm$^{-1}$ or over.

Ion conductivity of a solid electrolyte in the state of gel is generally lower than ion conductivity of an electrolytic solution. In a case where an inorganic oxide of a low ion conductivity is added to a solid electrolyte in the state of gel for increasing mechanical strength, the ion conductivity of the electrolyte is generally further reduced. It has been found that, by employing lithium ion conductive glass-ceramic powder as an adder, reduction in lithium ion conductivity of the electrolyte can be prevented and a composite electrolyte having high lithium ion conductivity and sufficient mechanical strength can be provided. In the composite electrolyte of the invention, the glass-ceramic powder as the adder should preferably consist of glass-ceramic grains having higher lithium ion conductivity than lithium ion conductivity of the composite electrolyte. More specifically, the lithium ion conductivity of glass-ceramic grains constituting the glass-ceramic powder should preferably be $1 \times 10^{-4}$ S·cm$^{-1}$ and, more preferably $1 \times 10^{-3}$ S·cm$^{-1}$.

As the medium for the composite electrolyte of the invention, a sheet-like polymer material containing glass-ceramic powder is preferable because, in case the composite electrolyte comprising this medium is used for a secondary cell, a cell can have a large cell capacity per volume and the composite electrolyte has sufficient flexibility for forming it to various shapes. As the medium for the composite electrolyte of the invention, a porous material having fine pores is preferable so that the medium can impregnate a non-aqueous electrolytic solution and thereby become a gel.

As the sheet-like polymer material for the composite electrolyte of the invention, useful polymer materials include, but not limited to, polyolefins such as polyethylene, and polypropylene, fluorine-contained resins such as polytetrafluoroethylene, polychlorofluoroethylene and polyvinylidene fluoride, polyamides, polyesters and polyacrylates. A material for the medium is required to have the properties that it can be stably impregnated with an electrolytic solution, it has good processability, it has sufficient flexibility, it has good compatibility with glass-ceramics and has a high ion conductivity. Fluorine-contained resins are particularly preferable as a material having these properties in a well-balanced state.

As a solute constituting a non-aqueous electrolytic solution of the composite electrolyte of the invention, useful materials include, for example, lithium compounds such as hexafluorolithium phosphate (LiPF$_6$), tetrafluorolithium borate (LiBF$_4$), lithium perchlorate (LiClO$_4$), hexafluorolithium arsenate (LiAsF$_6$), trifluoromethane lithium sulfonate (LiCF$_3$SO$_3$LiClO$_4$) and trifluoromethane imide lithium sulfonate (LiN(CF$_3$SO$_2$)$_2$).

As a solvent for the above described solute, useful materials include, for example, organic solvents such as ethylene carbonate, propylene carbonate, butylene carbonate, dimethyl carbonate, diethyl carbonate, $\gamma$-butyrolactone, sulfolane, 1,2-dimethoxiethane, dimethyl ether and acetonitrile. The above described solute is resolved in the solvent to produce a non-aqueous electrolytic solution which can be used in the composite electrolyte of the invention. The composite electrolyte of the invention preferably is in the state of gel. By being in the state of gel, the composite electrolyte can impregnate the non-aqueous electrolytic solution in a high concentration in a stable manner and high ion conductivity thereby can be realized. By employing the above described non-aqueous electrolytic solution, the composite electrolyte of the invention can be maintained in the state of gel.

If, in adding the lithium ion conductive glass-ceramic powder having high lithium ion conductivity to the electrolyte, the amount of the glass-ceramic powder is too small, the lithium ion conductivity of the composite electrolyte is not improved and mechanical strength of the composite electrolyte is not improved either. If an excessive amount of the glass-ceramic powder is added, the amount of the electrolytic solution is reduced to that extent and, therefore, contact between the composite electrolyte, i.e., glass-ceramic powder and electrodes becomes contact between solids with the result that contact between them becomes insufficient and movability of lithium ion between the electrodes and the composite electrolyte and glass-ceramic powder thereby is reduced. For this reason, the lower limit of the amount of the lithium ion conductive glass-ceramic powder in the medium should preferably be 10 weight percent and, more preferably, 20 weight percent whereas the upper limit of the amount of the glass-ceramic powder should preferably be 90 weight percent and, more preferably, 80 weight percent.

The composite electrolyte of the invention comprises lithium ion conductive glass-ceramic powder. This glass-ceramic preferably consists of a glass-ceramic containing, as a predominant crystal phase, Li$_{1+x+y}$Al$_x$Ti$_{2-x}$Si$_y$P$_{3-y}$O$_{12}$ ($0 \leq x \leq 1$, $0 \leq y \leq 1$). This glass-ceramic powder can be obtained by heat treating a base glass having a composition of Li$_2$O—Al$_2$O$_3$—TiO$_2$—SiO$_2$—P$_2$O$_5$ to produce a glass-ceramic containing, as a predominant crystal phase, a crystal of Li$_{1+x+y}$Al$_x$Ti$_{2-x}$Si$_y$P$_{3-y}$O$_{12}$ and thereafter crushing it to powder. Preferable parameters of the predominant crystal phase of Li$_{1+x+y}$Al$_x$Ti$_{2-x}$Si$_y$P$_{3-y}$O$_{12}$, are $0 \leq x \leq 1$, $0 \leq y \leq 1$ and, more preferably, $0 \leq x \leq 0.4$, $0 \leq y \leq 0.6$. Preferable composition ranges of ingredients of the base glass expressed in mol % on oxide basis are:

| | |
|---|---|
| $Li_2O$ | 12–18% |
| $Al_2O_3$ | 5–10% |
| $TiO_2$ | 35–45% |
| $SiO_2$ | 1–10% |
| $P_2O_5$ | 30–40% |

By adopting a composition within these composition ranges of the ingredients, molten glass can be cast to produce the base glass easily and, besides, the glass-ceramic obtained by heat treating this base glass exhibits high lithium ion conductivity.

The lithium secondary cell of the invention has a positive electrode, a negative electrode and a separator which comprises the glass-ceramic composite electrolyte as described above. In the lithium secondary cell of the invention, the positive electrode can be made of a material including, as its principal ingredient, a transition metal compound which can store and discharge lithium. For example, a transition metal oxide containing a transition metal such as manganese, cobalt, nickel, vanadium, niobium, molybdenum and titanium and also lithium can be used for the positive electrode. A positive electrode containing lithium cobaltite as a principal ingredient is preferable in having a high electromotive force and excellent cyclic characteristics.

As a negative electrode of the lithium secondary cell of the invention, metal lithium or a material such as an alloy, oxide and carbon material which can store and discharge lithium ion can be used.

EXAMPLES

Specific examples of the composite electrolyte and the lithium secondary cell comprising the composite electrolyte of the invention will be described below. Comparative examples will be also described for making it clear that the composite electrolyte and the lithium secondary cell comprising the composite electrolyte of the invention are superior to these comparative examples. It should be noted that the invention is not limited to these examples but various modifications can be made within the spirit and scope of the invention.

Example 1

Preparation of Lithium Ion Conductive Glass-ceramic Powder

As raw materials, $NH_4H_2PO_4$, $Al(PO_3)_3$, $Li_2CO_3$, $SiO_2$ and $TiO_2$ were used. These raw materials were weighed so that a composition of 35.0% $P_2O_5$, 7.5% $Al_2O_3$, 15.0% $Li_2O$, 38.0% $TiO_2$ and 4.5% $SiO_2$ would be obtained and mixed uniformly. The mixed materials were put in a platinum pot and melted in an electric furnace at 1500° C. for two hours while the glass melt was stirred continuously. Then, the glass melt was cast directly into water to produce base glass. This base was heat treated at 950° C. for twelve hours for producing the target glass-ceramic. It was confirmed by the powder X-ray diffraction method that this glass-ceramic contained as its predominant crystal phase $Li_{1+x+y}Al_xTi_{2-x}Si_yP_{3-y}O_{12}$ ($0 \leq x \leq 0.4$, $0 \leq y \leq 0.6$). Lithium ion conductivity of this glass-ceramic was $1.4 \times 10^{-3} S \cdot cm^{-1}$ at room temperature (25° C.). This glass-ceramic was crushed by a ball mill and grains of the crushed glass-ceramic were classified. Lithium ion conductive glass-ceramic powder having an average grain diameter of 7 μm was thus obtained.

Preparation of the Medium

Powders of polyvinylidene fluoride (PVdF), hexafluoropropylene (HFP) and the lithium ion conductive glass-ceramic obtained in the above described manner in the weight ratio of 35:40:25 were added to acetone in the amount of 20 weight percent to prepare an acetone suspension. This suspension was formed to a film by casting and thereafter was dried in vacuum. A sheet-like glass-ceramic composite medium having thickness of 50 μm was obtained.

Preparation of Non-aqueous Electrolytic Solution

In a solvent of ethylene carbonate (EC) and dimethyl carbonate (DMC) mixed together in the weight ratio of 50:50, hexafluorolithium phosphate ($LiPF_6$) was resolved in the concentration of 1 mol/L to produce a non-aqueous electrolytic solution.

Preparation of Composite Electrolyte

The above described composite electrolyte was impregnated with the above described non-aqueous electrolytic solution for ten minutes and a sheet-like composite electrolyte in the state of gel was obtained.

Measurement of Ion Conductivity

A specimen for measuring lithium ion conductivity was prepared by holding the composite electrolyte with a couple of stainless sheets which served as electrodes. Impedance at room temperature was measured and ion conductivity was calculated on the basis of measured impedance. The ion conductivity thus measured was $3.1 \times 10^{-4} S \cdot cm^{-1}$.

Comparative Example 1

A sheet-like composite electrolyte was prepared in the same manner as in Example 1 excepting that surface-modified fumed silica ($SiO_2$) of the same amount was used instead of the lithium ion conductive glass-ceramic. Ion conductivity was measured in the same manner. The measured ion conductivity was $1.7 \times 10^{-4} S \cdot cm^{-1}$.

Comparing Example 1 with Comparative Example 1, it was found that the ion conductivity of the composite electrolyte film of Example 1 had ion conductivity which was nearly twice as high as that of Comparative Example 1. This is because Example 1 contains the ion conductive glass-ceramic.

Example 2

A lithium secondary cell having a positive electrode, a negative electrode and a separator made of the glass-ceramic composite electrolyte was prepared.

Preparation of Positive Electrode

For preparing the positive electrode, commercially available lithium cobaltite ($LiCoO_2$) was used as a material of the positive electrode, acetylene black was used as an electric conductor and fluorine-contained resin polyvinylidene fluoride (PVdF) was used as a binder. Lithium cobaltite, acetylene black and polyvinylidene fluoride in the weight ratio of 82:10:8 were mixed by using acetone. Then, by casting, this mixture was coated on an aluminum foil having thickness of 10 μm. The mixture was then dried at 100° C. Thus, a sheet-like positive electrode having thickness of about 100 μm was provided on the positive electrode collector (aluminum foil).

Preparation of Negative Electrode

For preparing the negative electrode, commercially available graphite powder of 10 μm was used as a material of the negative electrode and fluorine-contained resin polyvinylidene fluoride (PVdF) was used as a binder. The graphite powder and polyvinylidene fluoride in the weight ratio of 92:8 were mixed by using acetone. Then, the mixture was coated on a copper foil having thickness of 10 μm by casting and dried at 100° C. Thus, a sheet-like negative electrode having thickness of about 100 μm was provided on the negative electrode collector (copper foil).

Preparation of Medium

A sheet-like glass-ceramic composite electrolyte was prepared in the same manner as in Example 1.

Preparation of Non-aqueous Electrolytic Solution

A non-aqueous electrolytic solution was prepared in the same manner as in Example 1.

Assembling of the Lithium Secondary Cell

The above described sheet-like glass-ceramic composite medium which constituted the separator was held by the above described positive and negative electrodes and adhered together by a double roller laminator. Thus, a five-layer structure having the positive electrode collector, positive electrode, glass-ceramic composite medium, negative electrode and negative electrode collector was assembled. This five-layer structure was soaked in the above described non-aqueous electrolytic solution for ten minutes at room temperature to have the glass-ceramic composite medium impregnated with the non-aqueous electrolytic solution and thereby produce a composite electrolyte. Thus, a lithium secondary cell having this composite electrolyte as the separator was produced. The amount of the non-aqueous electrolytic solution impregnated was about 60% of the weight of the composite electrolyte. The structure of this lithium secondary cell is shown in FIG. 1. In the lithium secondary cell of FIG. 1, reference character 1 designates the positive electrode collector, 2 the positive electrode, 3 the glass-ceramic composite electrolyte, 4 the negative electrode and 5 the negative electrode collector. Six layers of this lithium secondary cell each layer having an area of 8 $cm^2$ were laminated to assemble a lithium secondary cell of a 400 mAh class. A charging and discharging cycle test was conducted on this lithium secondary cell under a constant current at room temperature (25° C.). In this test, discharging capacity of the cell was measured under conditions of final voltage in charging of 4.2V, final voltage in discharging of 3.0V and charging speed of 10 mA/$cm^2$. The energy capacity of this lithium secondary cell was 1480 mWh.

Comparative Example 2

Simultaneously with preparation of the medium, a lithium secondary cell was prepared in the same manner as in Example 2 excepting that surface-modified fumed silica ($SiO_2$) powder of the same amount was added instead of the lithium ion conductive glass-ceramic powder. The charging and discharging test was conducted at the same conditions as in Example 2 to measure the discharging capacity of the cell.

Results of measurement of initial discharging capacities and discharging capacities at the three hundredth cycle of the cells of Example 2 and Comparative Example 2 are shown in the following Table 1:

TABLE 1

| | Discharging capacity (mAh/$cm^2$) | |
|---|---|---|
| | Initial | 300-th cycle |
| Example 2 | 7.4 | 6.4 |
| Comparative Example 2 | 5.8 | 5.2 |

As will be apparent from Table 1, the cell of Example 2 has a larger discharging capacity than Comparative Example 2. Besides, theoretical cell capacity of this cell is about 8 mAh/$cm^2$ and the cell of Example 2 exhibits a value which is close to the theoretical cell capacity. Thus, it is understood that the cell of Example 2 has an excellent cell property.

Figure 2:
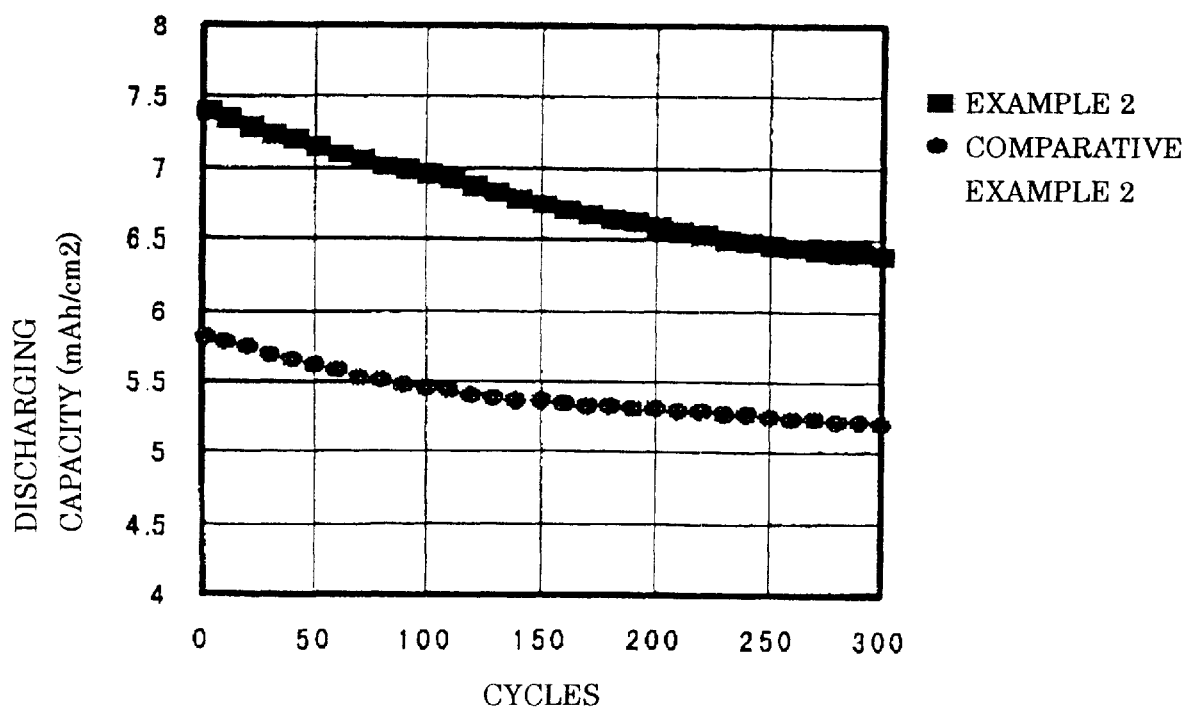
FIG. 2 is a graph showing change in discharging capacity in charging and discharging cycles of lithium secondary cells including composite electrolytes of Example 2 and Comparative Example 2.

Change in the charging and discharging capacities with the charging and discharging cycle of the cells of Example 2 and Comparative Example 2 is shown in FIG. 2.

From FIG. 2, it will be apparent that the discharging capacity of Example 2 is much larger than that of Comparative Example 2 both in the initial stage and at the 300-th cycle. Thus, by incorporating the lithium ion conductive glass-ceramic as the electrolyte, a lithium secondary cell of a high capacity can be realized.

Example 3

A lithium secondary cell having the same composite electrolyte as in Example 2 was assembled and the charging and discharging cycle test was conducted at room temperature (25° C.) under the same conditions of final voltage in charging of 4.2V, final voltage in discharging of 3.0V but at a quick charging speed which is three times as high as the charging speed in Example 2.

Comparative Example 3

A lithium secondary cell was assembled in the same manner as in Comparative Example 2 and the charging and discharging cycle test was conducted at room temperature (25° C.) under the same conditions of final voltage in charging of 4.2V, final voltage in discharging of 3.0V but at a quick charging speed which is three times as high as the charging speed in Example 2.

Results of measurement of the initial discharging capacities and discharging capacities at the 300-th cycle of the cells of Example 3 and Comparative Example 3 are shown in the following Table 2:

TABLE 2

| | Discharging capacity (mAh/$cm^2$) | |
|---|---|---|
| | Initial | 300-th cycle |
| Example 3 | 7.1 | 5.9 |
| Comparative Example 2 | 5.4 | 4.6 |

As will be apparent from Table 2, the cell of Example 3 has a larger discharging capacity than Comparative Example 3 and has an excellent cell property even in the quick charging.

Change in the charging and discharging capacities with the charging and discharging cycle of the cells of Example 3 and Comparative Example 3 is shown in FIG. 3.

From FIG. 3, it will be apparent that the discharging capacity of Example 3 is much larger than that of Comparative Example 3 both in the initial stage and at the 300-th cycle.

Example 4

A lithium secondary cell having the composite electrolyte as in Example 2 was assembled and the charging and discharging cycle test was conducted at the same condition of final voltage in charging of 4.2V and final voltage in discharging of 3.0V but with the operation temperature changing. The tests were conducted at −10° C., 0° C., 25° C., 50° C. and 75° C.

Comparative Example 4

A lithium secondary cell was assembled in the same manner as in Comparative Example 2 and the charging and discharging cycle test was conducted at the same condition of final voltage in charging of 4.2V and final voltage in discharging of 3.0V but with the operation temperature changing. The tests were conducted at −10° C., 0° C., 25° C., 50° C. and 75° C.

Figure 4:
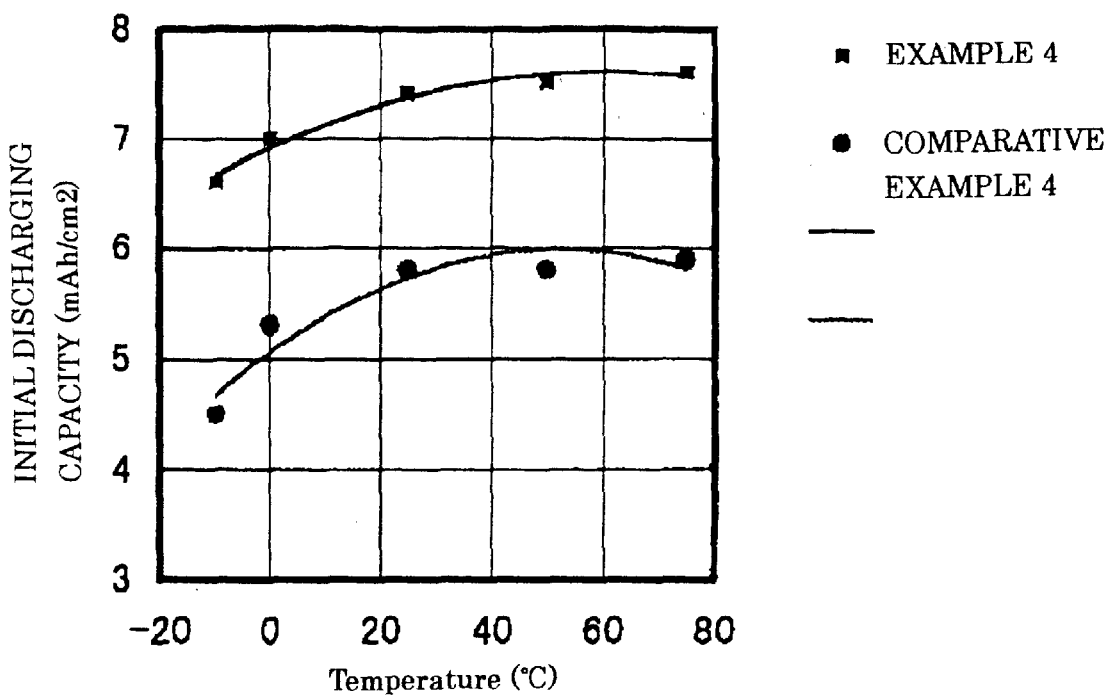
FIG. 4 is a graph showing initial discharging capacity relative to temperature conditions of lithium secondary cells including composite electrolytes of Example 4 and Comparative Example 4.

Change in the initial discharging capacities relative to the respective operation temperatures of the cells of Example 4 and Comparative Example 4 is shown in FIG. 4.

It will be apparent from FIG. 4 that the cell of Example 4 maintains a large discharging capacity over a broad operation temperature range from −10° C. to 75° C. and has an excellent cell property as compared with Example 4.

Example 5

A lithium secondary cell comprising the sheet-like glass-ceramic composite medium was prepared in the same manner as in Example 2 excepting that polyvinylidene fluoride (PVdF) powder and lithium ion conductive glass-ceramic powder were mixed at the weight ratio of 60:40 in an acetone suspension without using hexafluoropropylene (HFP) which was used as a plasticizer and formed to the sheet-like glass-ceramic composite medium. The amount of the non-aqueous electrolytic solution impregnated was about 18% of the weight of the composite electrolyte.

Comparative Example 5

A cell was prepared in the same manner as in Example 5 excepting that in producing the medium, surface-modified fumed silica ($SiO_2$) powder of the same amount was added instead of the lithium ion conductive glass-ceramic powder.

Figure 5:
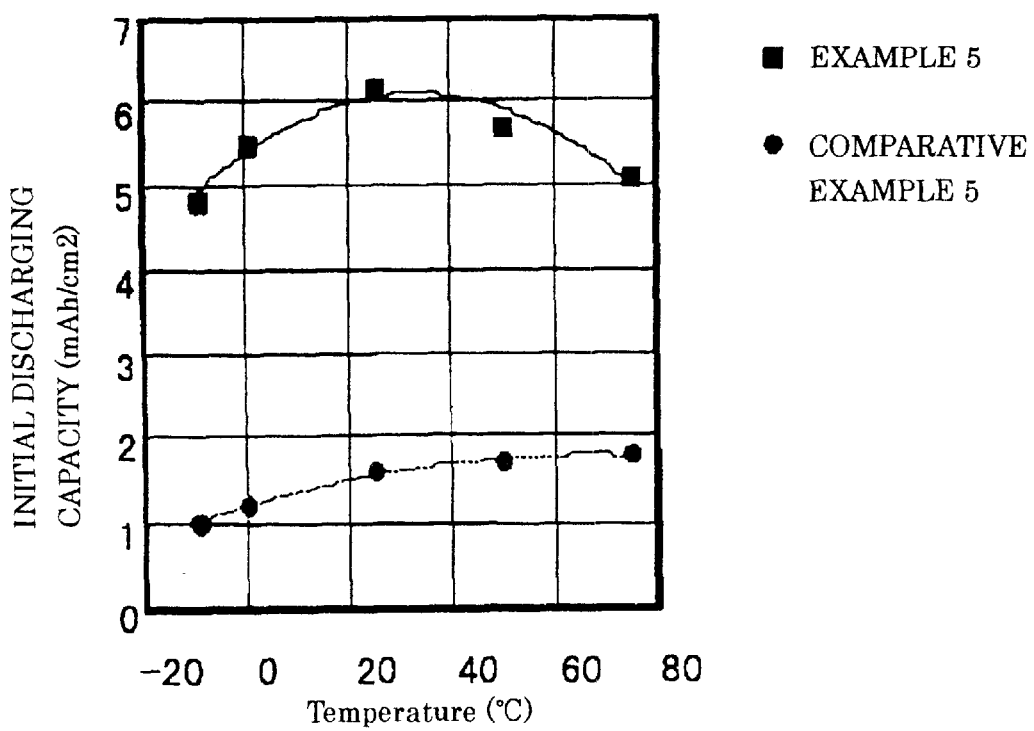
FIG. 5 is a graph showing initial discharging capacity relative to temperature conditions of lithium secondary cells including composite electrolytes of Example 5 and Comparative Example 5.

The cells of Example 5 and Comparative Example 5 which do not use hexafluoropropylene (HFP) as a plasticizer are inferior in impregnation of the electrolytic solution, i.e., about 30% of the cells of Example 4 and Comparative Example 4 which used hexafluoropropylene. Change in the initial discharging capacities relative to the respective operation temperatures of the cells of Example 5 and Comparative Example 5 is shown in FIG. 5.

The cell of Comparative Example 5 which contains only about 30% of electrolytic solution of the cells of Comparative Examples 2 to 4 exhibited a very small discharging capacity. In contrast, the cell of Example 5 which likewise contains only about 30% of electrolytic solution exhibited a sufficiently high discharging capacity which is almost equivalent to or even more of the discharging capacity of the cell of Comparative Example 4. This superiority of the cell of Example 5 is attributable to superiority of the lithium ion conductive glass-ceramic contained in the composite electrolyte. In other words, even in a case where the ratio of the electrolytic solution which is an organic liquid component in the lithium secondary cell is reduced, a cell having a sufficiently high discharging capacity can be provided and, as a result, a lithium secondary cell which is improved in safety can be provided.

What is claimed is:

1. A glass-ceramic composite electrolyte comprising a medium containing lithium ion conductive glass-ceramic powder impregnated with a non-aqueous electrolytic solution, wherein said glass-ceramic powder has lithium ion conductivity equal to or greater than $1 \times 10^{-4}$ S·cm$^{-1}$ and consists of grains having an average grain diameter equal to or less than 20 $\mu$m calculated on the basis of volume and a maximum grain diameter equal to or less than 44 $\mu$m.

2. A composite electrolyte as defined in claim 1 wherein said medium comprises a sheet of polymer material containing glass-ceramic powder.

3. A composite electrolyte as defined in claim 1 wherein said medium contains 10% to 90% in weight percent of the glass-ceramic powder.

4. A lithium secondary cell having a positive electrode, a negative electrode and a separator wherein said separator comprises the composite electrolyte as defined in claim 1.

5. A composite electrolyte comprising a medium containing glass-ceramic powder impregnated with a non-aqueous electrolytic solution, having a thickness equal to or less than 100 $\mu$m and lithium ion conductivity equal to or greater than $1 \times 10^{-5}$ S·cm$^{-1}$.

* * * * *